United States Patent [19]

Caldwell et al.

[11] Patent Number: 5,182,236
[45] Date of Patent: Jan. 26, 1993

[54] GRADIENT INDEX GLASSES AND SOL-GEL METHOD FOR THEIR PREPARATION

[75] Inventors: J. Brian Caldwell, Highland Park, N.J.; Mark A. Banash, Newtown; Tessie M. Che, both of Newtown, Pa.; Robert M. Mininni, Skillman, N.J.; Victor N. Warden, Hillsborough, N.J.

[73] Assignees: Enichem S.p.A., Milan, Italy; Istituto Guido Donegani S.p.A., Novara, both of Italy

[21] Appl. No.: 764,453

[22] Filed: Sep. 24, 1991

[51] Int. Cl.$^5$ ............................................. C03C 4/00
[52] U.S. Cl. ..................................... 521/12; 501/54; 501/55; 65/3.11; 65/3.15; 65/31
[58] Field of Search ............................. 501/12, 54, 55; 65/3.11, 3.15, 31

[56] References Cited

U.S. PATENT DOCUMENTS

| | | |
|---|---|---|
| 3,938,974 | 2/1976 | Macedo et al. ............................ 65/3 |
| 4,389,233 | 6/1983 | Kurosaki et al. ................. 501/12 X |
| 4,436,542 | 3/1984 | Kurosaki ............................ 501/12 X |
| 4,640,699 | 2/1987 | Ohmi et al. ......................... 65/3.15 |
| 4,686,195 | 8/1987 | Yamane ................................. 501/12 |
| 4,797,376 | 1/1989 | Caldwell et al. ....................... 501/12 |
| 4,902,650 | 2/1990 | Caldwell et al. ....................... 501/12 |
| 5,068,208 | 11/1991 | Haun et al. ............................. 501/12 |

OTHER PUBLICATIONS

Caldwell et al, Mat. Res. Soc. Symp. Proc. vo. 180 (1990), pp. 727–732.
Che et al, "Sol-Gel Optics", Proceedings Reprint, SPIE-The International Society for Optical Engineering, vol. 1328 (1990), pp. 145–159.

*Primary Examiner*—Karl Group
*Attorney, Agent, or Firm*—Oblon, Spivak, McClelland, Maier & Neustadt

[57] ABSTRACT

A gradient index glass comprised of $(SiO_2)_m(R_2O)_nX_p$, wherein R is Li, Na, K, Rb, or Cs, and $X = TiO_2$, $ZrO_2$ and/or $HfO_2$, m is 44 to 99, n is 0.25 to 20, p is at least 0.1, and $m+n+p=100$. The gradient index glass is obtained by: (1) mixing a silicon alkoxide and an alcohol in a water solution sufficiently acidic to partially hydrolyze the silicon alkoxide, (2) adding to the mixture a titanium alkoxide or a zirconium alkoxide, (3) causing gelation of the mixture through conversion of the metal alkoxides in solution to an interconnected network of the corresponding metal oxides by stirring or adjusting the pH of the solution, and pouring the solution into a mold, (4) allowing the solution to form a gel, (5) placing the gel in an acid leaching bath to leach out some of the index modifying metal oxide, (6) fixing the gel in a solvent bath, (7) placing the fixed gel in an aqueous or alcoholic alkali salt solution bath to obtain uniform distribution of the alkali ions within the gel, (8) placing the gel in a polar solvent and obtaining an alkali salt precipitate, (9) drying the gel for a time sufficient to remove liquid from the gel, and (10) sintering the dried gel into a transparent gradient index glass.

25 Claims, 2 Drawing Sheets

GRADIENT INDEX GLASSES AND SOL-GEL METHOD FOR THEIR PREPARATION

BACKGROUND OF THE INVENTION

1. Field of the Invention

The invention relates to gradient index glasses obtained through a sol-gel process.

2. Discussion of the Background

Gradient index (GRIN) optical materials have become a prominent part of modern optics. GRIN materials are characterized by a refractive index distribution which varies spatially in a controlled manner.

For example, cylindrical glass rods with parallel plane faces can be made with a refractive index higher along the central axis than at the outer edges, i.e., the index changes in a radial fashion with the highest index centrally located along the axis and the lowest index located at the outer surface. The change in index from the axis to the outer surface is referred to as the delta-n ($\Delta n$). These rods can be used to focus light despite their plane end faces because light follows a curved path within the material. Illustratively, $TiO_2:R'_2O:SiO_2$ GRIN glasses have been reported in which the gradient is caused by a gradient of two or more $R'_2O$ components, such as $Ag_2O:Na_2O$ or $Ti_2O:K_2O$ or $Cs_2O:K_2O$.

GRIN lenses have received attention in recent years because of their application in fiber optics, photocopiers, fax equipment, and so on. A graph of index of refraction versus spatial position is commonly referred to as the index profile. The manner in which the index profile changes with different wavelengths of light is called the index profile dispersion. Delta-n, the shape of the index profile and the index profile dispersion are the most important characteristics of a gradient index glass.

The use of gradient index glass in optical systems provides many advantages over homogeneous glass. These advantages include improved performance and greater simplicity by reducing the total number of optical elements needed in a system.

In general, GRIN designs require fewer elements than their homogeneous counterparts. Thus, definite benefits exist with respect to size, weight, and economics when using GRIN materials in fiber and integrated (miniaturized systems) optical applications. Furthermore, some systems can be designed using GRIN lenses which would be virtually impossible to configure using homogeneous lenses.

Several methods are known for making GRIN optical materials. These include ion exchange in solid glass, stuffing/unstuffing of porous glass, phase separation/leaching and sol-gel techniques. All these methods are similar in that they involve immersion of a substrate in a liquid phase to induce diffusion of index modifying components in order to create a composition gradient within the substrate.

The ion exchange method, which has been commercially developed for the production of GRIN lenses involves exchanging ions from a molten salt bath with those in a dense glass. This method, along with others, has been described by Mukherjee in: "Gradient Index Lens Fabrication Processes: A Review," Proceedings of a Topical Meeting on Gradient-Index Optical Imaging Systems, May 4-5, 1981, Honolulu, Hi, Optical Society of America, pp. TuAl-1 to TuAl-5, 1981. Drawbacks of materials produced by ion exchange techniques include small size, poor environmental and thermal stability, toxicity owing to ions like Tl, and a limited choice of index modifying ions which limits the variety of optical characteristics.

In the stuffing/unstuffing techniques, a porous glass preform, made by leaching a phase separated glass in acid, is stuffed with index modifying ions such as $Cs^+$ or $Tl^+$ by infiltration and precipitation of the analogous salt solutions. A concentration gradient of the modifier ions is then created by redissolving the salt and allowing it to diffuse out of the preform. The diffusion process is halted by precipitation after the desired composition profile is achieved, and the preform is dried and sintered. Such a method is described in U.S. Pat. Nos. 3,938,974, 4,302,331 and 4,640,699.

A drawback of this method is that it is difficult to produce small diameter GRIN rods in a consistent manner, due to the short diffusion times of the modifying ions. Furthermore, though this technique can be used to prepare lenses of 10 mm aperture, these lenses often exhibit index gradients which are not uniform because of the non-uniform pore size distribution created in the porous glass during the phase separation and leaching processes.

The "phase separation and leaching" technique is similar to the stuffing/unstuffing method in that the initial steps involve phase separating a suitable glass by heat treatment and then leaching away the soluble phase in an acid solution (Physics and Chemistry of Glasses 21, 22-24, 1980). In this case, however, the starting glass contains a significant amount of germanium dioxide which is not completely removed during leaching. A spatial variation in the concentration of $GeO_2$ is thus created by the processes of dissolution and diffusion. After leaching, the gel is washed, dried and sintered.

The primary disadvantage of the "phase separation and leaching" technique is that the selection of phase separable glasses is very limited.

Recently, researchers have been pursuing a number of avenues for making gradient index glass which utilize porous silicate preforms fabricated by sol-gel methods.

The potential advantages of using sol-gel precursors in the production of gradient index glass include: (1) relatively large diffusion coefficients; (2) low energy consumption during most of the process; (3) the ability to introduce a broad variety of index modifying dopants into the sol-gel preform; and (4) multi-component compositions can be formed into glasses of different sizes and shapes. The fabrication of a GRIN glass rod by sol-gel processes is especially advantageous for the manufacture of GRIN materials of large size and large variation of index.

Yamane (U.S. Pat. No. 4,686,195) produced a gradient index glass by a sol-gel technique. This technique involves mixing a silicon alkoxide with water, a source of boron oxide, and an aqueous metal salt solution which is the source of modifier cations. This mixture forms a gel which then is placed in a solution to leach out some of the metal salts contained within it and to have other metal salts introduced into it by diffusion. The gel then is dried and sintered into glass. The main problem with this technique is that since the index modifiers are introduced as salts they are not incorporated into the structural network of the gel until it is heated to higher temperatures. The modifier cations are thus free to migrate during the drying step, and this causes asymmetry in the final index profile.

Shingyouchi et al (Electronic Letters, 22:99-100 and 1108-1110, 1986), reported a different technique in which germanium as the index modifying cation, is introduced as an alkoxide rather than as a salt. The index modifier thus is fully incorporated into the gel structure, and the index profile does not suffer from uncontrollable asymmetry.

In this technique, tetramethoxysilane (a silicon alkoxide) is first combined with tetraethoxygermanium (a germanium alkoxide), ethanol, water and hydrochloric acid. The mixture forms a gel which is placed in water to leach out some of the germanium component. The gel is washed in methanol to fix the germanium concentration gradient, and then dried and sintered into gradient index glass.

Shingyouchi et al also used titanium to replace germanium as the index modifying cation. The resulting glass was a rod 2 mm in diameter with a $\Delta n$ of 0.013.

The method of Shingyouchi et al involves the use of only two components: silica and an index modifying oxide, such as germanium dioxide or titanium dioxide. The method can be generalized to substitute zirconium dioxide as well.

These binary systems, however, yield gels which shrink considerably during drying. This large shrinkage results in a dense gel which is difficult to sinter without fracturing or bloating. Binary $SiO_2$-$TiO_2$ also tends to crystallize at elevated temperatures if the $TiO_2$ content exceeds 4 to 5 mole percent. Binary $SiO_2$-$ZrO_2$ gels tend to bloat at elevated temperatures because the outside portions of the gel collapse before the inside portions, thereby trapping any internal gasses generated during heating. As a result, the method and compositions disclosed by Shingyouchi et al suffer from several flaws.

The flaws of the above existing techniques and compositions have been avoided in U.S. Pat. No. 4,797,376. Asymmetry of the index profile has been avoided by introducing the metal oxide precursor as an alkoxide instead of as a salt; and the difficulties inherent in binary metal oxide sol-gel systems have been avoided by using three or more components.

An alkoxide of silicon and at least two different metal alkoxides are added to form a mixture. The first of the alkoxides acts as an index modifier and is selected from the group consisting of alkoxides of titanium and zirconium. The second of the alkoxides acts as a gel modifier and is selected from the group consisting of alkoxides of boron, aluminum and germanium. The resulting ternary or greater solution is allowed to gel. The gel is placed in a leaching bath, dried, and then sintered to form a glass.

This process is however limited in the amount of index modifier ($TiO_2$ or $ZrO_2$) which can be incorporated in the final glass due to the problem of devitrification.

Moreover, one major problem with gradient index glass made by leaching alkoxide gels is that the maximum index change is small. This severely restricts the range of commercial applications.

SUMMARY OF THE INVENTION

These difficulties and limitations have been overcome by the present invention. The present invention is based on adding a significant amount of alkali during the process of making the glass to reduce the tendency toward devitrification and enlarge both the glass forming region and the maximum index change, thus producing a substantially new class of gradient index glasses. The present invention provides a solgel technique for making new gradient index glasses comprised of $(SiO_2)_m(R_2O)_nX_p$, where R=Li, Na, K, Rb, Cs, or a mixture thereof, X=$TiO_2$, $ZrO_2$, $HfO_2$, or a mixture thereof, m is 40 to 99, n is 0.25 to 20, p is at least 0.1, and m+n+p=100. Component "X" acts as an index modifier. In the present glasses, the index gradient is caused by a composition gradient of "X".

DETAILED DESCRIPTION OF THE PREFERRED EMBODIMENTS

Figure 1:
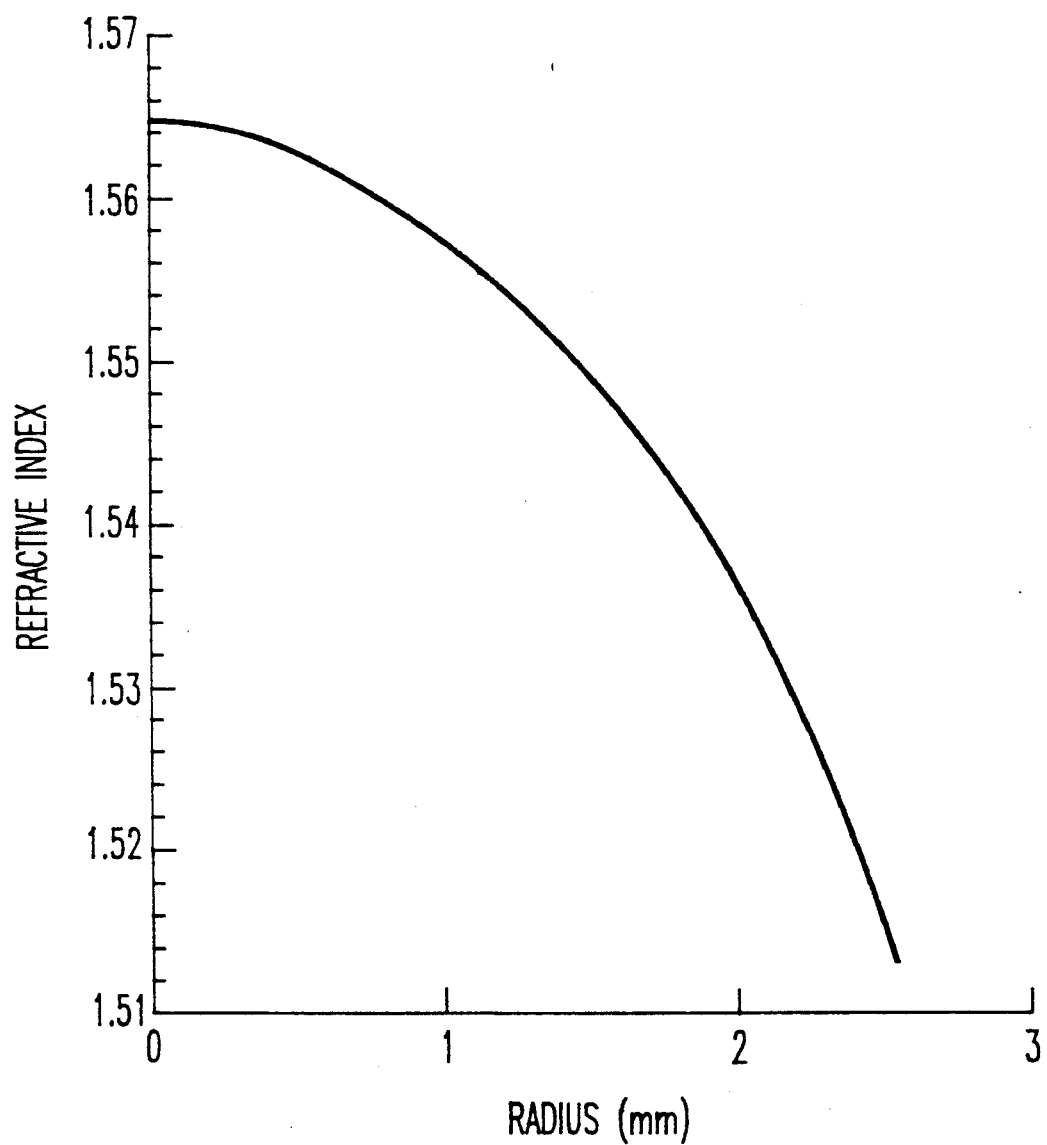
FIGS. 1 and 2 illustrate the refractive index change ($\Delta n$) for gradient index glass materials provided by the present invention, and in particular FIGS. 1 and 2 provide a plot of refractive index vs. radius for radial gradient index glasses prepared in accordance with Examples 1 and 2 described infra, respectively.

A basic concept provided by the invention is to make a precursor gel from metal $C_{1-6}$ alkoxides which includes at least one index modifier, and optionally some other components such as B, Al, or Ge. The concentration of any single index modifier in this precursor gel may be as high as 50 mole %. After aging which may be carried out at a temperature of from 200° C. to 25° C. for 5 minutes to 2 weeks, preferably 18 hr to 24 hrs, the precursor gel is soaked in an acid solution to partially leach out the main index modifier, "X", thereby creating a concentration gradient of that modifier. After leaching for an appropriate period of time, the gel is soaked in a $C_{1-4}$ alcohol or acetone to arrest the leaching process.

The gel is then soaked in a 0.1 to 2 M aqueous or $C_{1-6}$ alcoholic alkali acetate solution. After the gel is uniformly impregnated with the alkali solution, it is placed in an acetone bath to precipitate the alkali acetate. After thorough washing in acetone, the gel is dried and then sintered into transparent gradient index glass.

Alkali is added to the gel to enlarge the glass forming region, thereby increasing the amount of index modifier which can be incorporated into the final glass. For example, binary $TiO_2$-$SiO_2$ glasses are limited to about 10 mole percent $TiO_2$, because devitrification occurs with higher $TiO_2$ concentrations. However, if an alkali dopant such as Na or K, is added to the glass, the $TiO_2$ concentration can be increased to more than 50 mole percent. Thus, a larger index change can be obtained by increasing the amount of index modifier in the initial gel. The addition of alkali also reduces the temperature required to fully sinter the gel into glass. This reduces both furnace and energy costs.

The advantage of adding the alkali by the process of soaking in a solution followed by precipitation is that nearly all of the alkali is retained in the final glass. If the alkali components were added during the initial gel formulation step, they would be completely dissolved out of the gel during the various processing steps. By stuffing the alkali into the gel after the index modifier concentration gradient has been created and fixed in place, one can be assured that the final glass will contain the desired amount of alkali.

In one of its embodiments, the present invention provides a method for making gradient index glass, comprised of $(SiO_2)_m(R_2O)_nX_p$. This method comprises the steps of:

(1.) Combining a silicon $C_{1-6}$ alkoxide and $C_{1-4}$ alcohol in a water solution preferably sufficiently acidic (pH 4 to 7) to partially hydrolyze the alkoxide.

(2.) Adding to the mixture obtained in (1.) above an index modifying metal $C_{1-6}$ alkoxide selected from the group consisting of $C_{1-6}$ alkoxides of titanium, zirconium, and hafnium.

(3.) Optionally adding to the mixture one or more additional metal $C_{1-6}$ alkoxide elements for providing an index modifying oxide, where the additional metal $C_{1-6}$ alkoxide element is one member selected from the group consisting of $C_{1-6}$ alkoxides of aluminum, boron and germanium.

(4.) Stirring the resulting solution with additional water sufficient to cause gelation by conversion of the metal alkoxide in solution to an interconnected network of the corresponding metal oxides.

(5.) Pouring the solution into a mold.

(6.) Allowing sufficient time for the solution to form a gel.

(7.) Placing the gel into an acid leaching bath for a time sufficient to leach out some of the index modifying metal oxide.

(8.) Fixing the gel in a $C_{1-4}$ alcoholic bath.

(9.) Placing the gel in an aqueous or $C_{1-4}$ alcoholic alkali acetate solution bath for a time sufficient to allow a uniform distribution of alkali ions within the gel.

(10.) Placing the gel in an acetone bath to precipitate the alkali acetate.

(11.) Washing the gel at least one time with acetone.

(12.) Drying the gel for a time sufficient to remove liquid from within the gel.

(13.) Sintering the dried gel into transparent gradient index glass.

With reference to the preceding procedure, a $C_{1-6}$ alkoxide of silicon, diluted with $C_{1-4}$ alcohol, is partially hydrolyzed by adding a small amount of slightly acidic water (pH=4-7) to form a mixture.

After the partial hydrolysis at least one metal $C_{1-6}$ alkoxide is added to the mixture. When two or more metal $C_{1-6}$ alkoxides are added, at least one of them is selected from the group consisting of titanium, zirconium and hafnium. These alkoxides act as index modifiers. Other $C_{1-6}$ alkoxides which can be added are selected from the group consisting of boron, aluminum and germanium. These latter alkoxides act as gel modifiers. The resulting solution is stirred.

Next, additional water is added to the alkoxide solution to facilitate its gelation, but prior to gelation, the solution is poured into a mold of a desired shape. After the solution gels, it is allowed to age at a temperature between 20° C. and 100° C. for a period of time between 1 hour and several weeks.

The aged gel is then placed in a leaching bath to leach out some of the index modifying dopant, thus creating a concentration profile of the dopant. The leaching bath consists of water, $C_{1-4}$ alcohol, and one or more acids selected from the group consisting of hydrochloric acid, sulfuric acid or nitric acid. A preferred bath is made up of isopropyl alcohol in combination with aqueous hydrochloric acid.

After leaching, the gel is placed in a $C_{1-4}$ alcoholic bath, preferably comprising methanol or ethanol, where it is soaked thoroughly. Several changes of the alcohol bath are carried out to arrest the leaching process.

The gel is then placed in an aqueous or $C_{1-6}$ alcoholic alkali acetate solution until the ions in the salt bath are uniformly dispersed within the gel. Incorporation of alkali into the gel allows the glass forming region to be enlarged, thereby allowing large amounts of index modifier to be incorporated into the final glass. Examples of alkali acetates include acetates of Li, Na, K, Rb or Cs.

After the gel is uniformly impregnated with the alkali solution, it is placed in an acetone bath to precipitate the alkali acetate. After washing in acetone, the gel is dried and then sintered into transparent gradient index glass. The sintering temperature ranges from 500° C. to 1000° C., depending on the composition of the gel.

Gradient index glass rods produced by this method can range in size from 1 to 15 mm in diameter. They also may have a $\Delta n$ of 0.1 or more (see FIG. 2). The use of zirconium oxide as an index modifier will result in a lower index profile dispersion than when titanium oxide is used.

The addition of $Al_2O_3$ to the gel helps to eliminate all of the problems inherent in a binary system. Gels containing $Al_2O_3$ tend to have a lower density and coarser microstructure when they are dried. The coarse structure makes the dry gel more resistant to fracture while it is heated. It also allows gaseous reaction products formed during sintering to flow freely out of the gel, thus helping to avoid bloating. $Al_2O_3$ tends to increase the temperature at which the gel collapses into glass, which means that the reactions which cause bloating are more likely to be completed before the gel collapses.

When added to a gel containing $TiO_2$, $Al_2O_3$ helps to reduce the rate of crystallization and increase the temperature at which crystallization occurs.

The addition of $B_2O_3$ to the gel helps to eliminate bloating because the $B_2O_3$ gradient created during the leaching stage lowers the sintering temperature of the center of the gel relative to the outer portions of the gel. This means that the middle will sinter first, and released gasses will therefore not be trapped within the collapsing gel. Also, $B_2O_3$ substantially reduces the tendency of a gel containing $TiO_2$ or $ZrO_2$ to crystallize at high temperatures.

$GeO_2$ performs a similar function to $B_2O_3$, but in addition, it makes a significant contribution to the total index change.

Tetramethoxysilane, or "TMOS", is the preferred silicon alkoxide for the source of silica in the gel. The preferred source of $B_2O_3$ is triethylborate or tributylborate. The preferred sources of $GeO_2$, $ZrO_2$, and $TiO_2$ are the ethoxides, propoxides, and butoxides of germanium, zirconium, and titanium, respectively. The preferred source of $Al_2O_3$ is aluminum di(sec-butoxide)acetoacetic ester chelate. The metal oxides ($SiO_2$, $TiO_2$, $ZrO_2$, $Al_2O_3$ and $GeO_2$) are formed from their corresponding metal alkoxides by hydrolysis and polycondensation reactions. These reactions lead to the formation of a highly porous oxide gel.

The amount of $SiO_2$ in the gel should be between 40 and 98 mole percent. Amounts less than 40 mole percent result in a gel which is too weak to withstand all of the processing steps. Amounts greater than 99 mole percent will not yield useful refractive index changes.

For gels incorporating $TiO_2$ as the main index modifier, the amount of $TiO_2$ in the gel should be at least 0.1 mole percent but can be more than 50 mole percent.

For gels incorporating $ZrO_2$ or $HfO_2$ as the main index modifier, the amount of $ZrO_2$ or $HfO_2$ should also be at least 0.1 mole percent but less than 50 mole percent.

The amount of $Al_2O_3$ or $B_2O_3$ should be between 0 and 25 mole percent, and the amount of $GeO_2$ should be less than 20 mole percent.

The amount of alkali dopant, such as Li, Na, K, Rb or Cs, in the gel as metal oxides, should be between 10 and 40 mole percent.

A more complete appreciation of the invention and many of the attendant advantages thereof will be readily obtained as the same becomes better understood by reference to the following detailed description when considered in connection with the accompanying drawings.

EXAMPLES

Example 1

First, a batch of gels with a 40% $TiO_2$–60% $SiO_2$ (mole %) composition is made by mixing 98.4 ml methanol and 26 ml tetramethoxysilane in a teflon beaker. Next, 3.12 ml aqueous 0.1 M HCl is added and the solution is stirred for about 10 minutes. Then 20 ml glacial acetic acid is added, and the solution is stirred for another 10 minutes. Next, 34.48 ml titanium isopropoxide is added and the resulting sol is stirred for 30 minutes. The sol is then chilled to 0° C. and 18 ml water is added. The reaction mixture is stirred for 2 minutes and then poured into cylindrical polypropylene molds with an internal diameter of 18 mm. The gels are allowed to stand at 22° C. for one day to allow gel formation and initial aging. The gels are then heated to 60° C. for one day to complete the aging process.

The remainder of this example will refer to the processing of one batch of gels prepared according to the above procedure. After cooling back to room temperature, the gel is removed from its sealed mold and placed in a 50 ml bath of 2.5 M HCl solution, which is prepared by diluting aqueous 12.1 M HCl with a 15% isopropyl alcohol/85% water (volume percent) solution. The gel is leached in this HCl solution for 20 hours with constant and gentle agitation. The gel is then washed thoroughly in methanol and placed in a 1.0 M potassium acetate solution, which is made by diluting an aqueous 4.0 M potassium acetate solution with methanol. After two days, the gel is transferred to an acetone bath in order to precipitate the potassium acetate within the gel pores. Next, the gel is dried at 60° C. inside a large test tube for one day, and then for another day at 100° C. Finally, the gel is sintered into gradient index glass by heating it in flowing air to 400° C. at a rate of 0.1 degrees per minute, then to 500° C. at 5 degrees per minute. The sample is purged with oxygen at 500° C. for 15 minutes, then heated in flowing helium to 680° C. at 5 degrees per minute. At this point, the glass appears to be fully dense and transparent. The glass has a total refractive index change ($\Delta n$) of 0.05 from center to edge, with the highest index at the center. The shape of the index profile is approximately parabolic (FIG. 1).

Example 2

Figure 2:
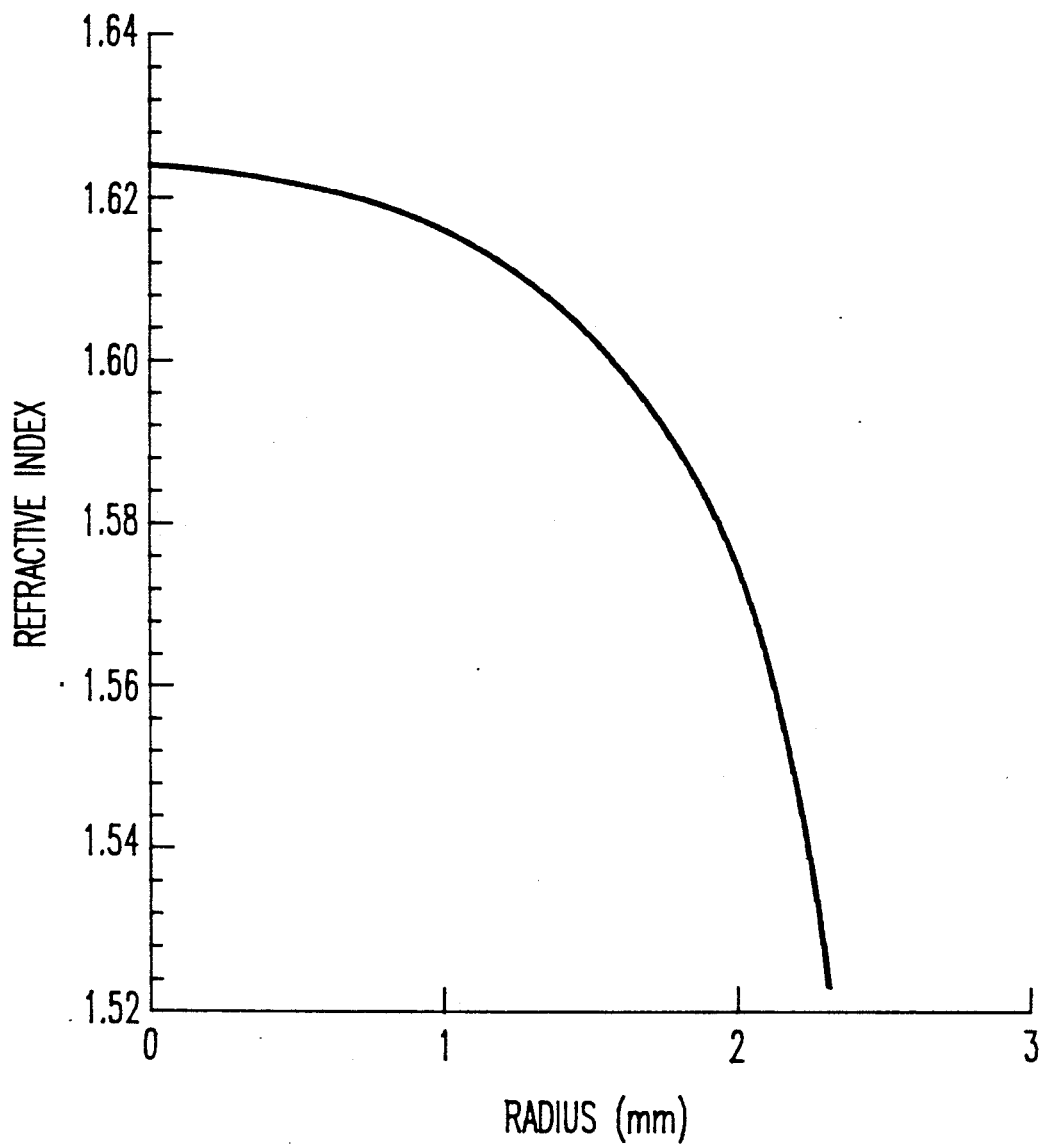

A gel composition identical to the one in Example 1 is molded in a 15 mm diameter teflon test tube and processed in the same way, except that it is leached in the HCl solution for only 4 hours. In this sample, $\Delta n$ equals 0.107, and the index profile is shown in FIG. 2.

Example 3

A batch of gels with a 40% $TiO_2$–60% $SiO_2$ (mole %) composition was prepared and processed as in Example 1, except that the gels were leached in a solution of 3.0 M HCl in 70% isopropyl alcohol: 0% water (volume percent) for 24 hours.

Each gel is then dried at 60° C. Finally, the gels are sintered into monolithic gradient index glass by the process of heating in flowing air to 400° C. at a rate of 0.5 degrees per minute, followed by heating in flowing helium to 740° C. at 5 degrees per minute. The product glass has a total refractive index change of 0.055 from center to edge, with a refractive index of 1.568 at the center. The shape of the index profile is approximately parabolic.

Example 4

A batch of cylindrical gels (16 mm diameter × 100 mm long) with the composition 5% $TiO_2$–10% $Al_2O_3$–85% $SiO_2$ (mole %), is prepared as follows. With vigorous stirring, 38.8 ml tetramethoxysilane is added to a solution containing 63 ml methanol and 63 ml N,N-dimethylformamide in a 250 ml round-bottom flask. After 20 minutes, 4.8 ml 0.1 M (aqueous) HCl is added to the reaction mixture. After another 30 minutes, a mixture consisting of 4.8 ml titanium isopropoxide and 9.32 g aluminum di(secbutoxide) acetoacetic ester chelate is added. The solution is stirred for one hour under ambient conditions, cooled in an ice bath and 17.6 ml water is then added. After 10 minutes, the solution is poured into plastic test tubes (18 ml capacity each). The tubes are sealed and gelation occurs within several hours at room temperature. The gels are allowed to stand at room temperature for one day and are then placed in an oven at 60° C. for 24 hours. Then, each gel is allowed to cool to room temperature and placed in 80 ml capacity glass test tubes containing 50 ml 2.5 M HCl in 15% isopropyl alcohol: 85% water (volume %) solution. The gel is leached in this HCl solution for 2 hours with constant and gentle agitation. The gel is then washed thoroughly in water and/or methanol to remove excess acid and soluble titanium complexes. It is then placed in 1.0 M potassium acetate in a 25% water: 75% methanol (volume %) solution for one day. The gel is then soaked in acetone in order to precipitate the potassium acetate within the gel pores.

After drying at 60° C., each gel is sintered into monolithic gradient index glass by the process of heating in flowing air to 400° C. at a rate of 0.5 degrees per minute, and then in flowing helium to 740° C. at 5 degrees per minute. The product glass rod has a total refractive index change of 0.01 from center to edge with a refractive index of 1.504 at the center. The shape of the index profile is approximately parabolic.

Example 5

A batch of 20% $TiO_2$–5% $Al_2O_3$–75% $SiO_2$ gels were prepared and processed as in Example 4, except for the following variations in reagents used:

33.6 ml tetramethoxysilane
18.0 ml titanium isopropoxide
4.4 g aluminum di(sec-butoxide)acetoacetic ester chelate The product glass has a total refractive index change of 0.03 from center to edge with a refractive index of 1.538 at the center. The shape of the index profile is approximately parabolic.

Obviously, numerous modifications and variations of the present invention are possible in light of the above teachings. I is therefore to be understood that within the scope of the appended claims, the invention may be practiced otherwise than as specifically described herein.

What is claimed is:

1. A gradient index glass comprised of $(SiO_2)_m(R_2O)_nX_p$, wherein R is at least one member selected from the group consisting of Li, Na, K, Rb and Cs, X is at least one member selected from the group consisting of $TiO_2$, $ZrO_2$, and $HfO_2$, m is 40 to 99, n is 0.25 to 20, p is at least 0.1, and $m+n+p=100$, wherein said glass comprises a composition gradient of X and a uniform distribution of $R_2O$.

2. The gradient index glass of claim 1 comprising $SiO_2$ oxide in an amount of between 40 and 98 mole percent.

3. The gradient index glass of claim 1 comprising $TiO_2$, $TiO_2$ or $HfO_2$ in an amount of between 0.5 and 50 mole percent.

4. The gradient index glass of claim 1, wherein R is selected from the group consisting of Li, Na and K.

5. The gradient index glass of claim 1 further comprising B, Al or Ge in an amount lower than 25 mole percent.

6. The gradient index glass of claim 1 wherein R is Li.

7. The gradient index glass of claim 1 wherein R is Na.

8. The gradient index glass of claim 1 wherein R is K.

9. The gradient index glass of claim 1 wherein R is Rb.

10. The gradient index glass of claim 1 wherein R is Cs.

11. The gradient index glass of claim 1 wherein X is $TiO_2$.

12. The gradient index glass of claim 1 wherein X is $ZrO_2$.

13. The gradient index glass of claim 1 wherein X is $HfO_2$.

14. A method for making a gradient index glass comprised of $(SiO_2)_m(R_2O)_nX_p$, where R is one member selected from the group consisting of Li, Na, K, Rb and Cs, X is one member selected from the group consisting of $TiO_2$, $ZrO_2$ and $HfO_2$, m is 40 to 99, n is 0.25 to 20, p is at least 0.1, and $m+n+p$ is 100, said method comprising the steps of:

(1) initiating gelation of a mixture of a silicon $C_{1-6}$ alkoxide and a $C_{1-4}$ alcohol in a water solution sufficiently acidic to partially hydrolyze said silicon $C_{1-6}$ alkoxide, to which a metal $C_{1-6}$ alkoxide which is one member selected from the group consisting of titanium, zirconium and hafnium $C_{1-6}$ alkoxides has been added, through conversion of said metal alkoxide in solution to an interconnected network of the corresponding metal oxides and pouring said solution into a mold;

(2) placing the gel obtained into an acid leaching bath for a time sufficient to leach out some of said metal oxide;

(3) fixing said gel in a solvent bath;

(4) placing said fixed gel in an aqueous or $C_{1-6}$ alcoholic alkali salt solution bath for a time sufficient to allow a uniform distribution of the alkali ions within the gel;

(5) placing said gel in a polar solvent and obtaining an alkali salt precipitate; and (6) drying said gel for a time sufficient to remove liquid from within the gel, and sintering said dried gel into a transparent gradient index glass.

15. The method of claim 14 comprising adding to the mixture of step (1) at least one additional metal $C_{1-6}$ alkoxide selected from the group consisting of aluminum, boron and germanium $C_{1-6}$ alkoxides, and washing the gel obtained in step (5) at least one time with a water-miscible solvent.

16. The method of claim 14 comprising using an amount of seed silicon $C_{1-4}$ alkoxide in step (1) sufficient to obtain a gradient index glass having between 40 and 98 mole percent of silicon oxide.

17. The method of claim 14, wherein the silicon $C_{1-6}$ alkoxide used in step (1) is tetramethoxysilane.

18. The method of claim 14, wherein the alcohol used in step (1) is methanol.

19. The method of claim 14 comprising using an amount of said metal $C_{1-6}$ alkoxide in step (1) sufficient to yield a gradient index glass having between 0.1 and 50 mole percent of metal oxide corresponding to said metal $C_{1-6}$ alkoxide.

20. The method of claim 15 wherein said additional metal alkoxide is used in an amount sufficient to yield a gradient index glass having less than 25 mole percent of metal oxide corresponding to said additional metal $C_{1-6}$ alkoxide.

21. The method of claim 15 in which said acid leaching bath of step (2) comprises water, a $C_{1-4}$ alcohol and at least one acid selected from the group consisting of hydrochloric acid, sulfuric acid, and nitric acid.

22. The method of claim 21 wherein said acid leaching bath comprises isopropyl alcohol and hydrochloric acid.

23. The method of claim 14 wherein said solvent used in the fixing bath of step (3) is a $C_{1-4}$ alcohol.

24. The method of claim 14 wherein said alkali salt of step (5) is one member selected from the group consisting of Li, Na, K, Rb, and Cs acetates.

25. The method of claim 24 wherein said amount alkali acetate is used in an amount sufficient to obtain a gradient index glass having between 10 and 40 mole percent of alkali oxide dopant.

* * * * *